US006825277B2

(12) United States Patent
van Issum et al.

(10) Patent No.: US 6,825,277 B2
(45) Date of Patent: Nov. 30, 2004

(54) HIGH-FREQUENCY WELDING OF NON-POLAR THERMOPLASTIC RUBBERS

(75) Inventors: Ernst van Issum, Grez Doiceau (BE); Purushottam Agrawal, Akron, OH (US); Phillip Neal, Overijse (BE); Antonius van Meesche, Rixensart (BE)

(73) Assignee: Advanced Elastomer Systems, L.P., Akron, OH (US)

( * ) Notice: Subject to any disclaimer, the term of this patent is extended or adjusted under 35 U.S.C. 154(b) by 0 days.

(21) Appl. No.: 10/273,088

(22) Filed: Oct. 17, 2002

(65) Prior Publication Data

US 2004/0077791 A1 Apr. 22, 2004

(51) Int. Cl.[7] ............................. C08F 8/00; C08L 9/00; C08L 23/04; C08L 27/04; C08L 33/14

(52) U.S. Cl. ...................... 525/191; 525/213; 525/222; 525/232; 525/233; 525/238; 525/240; 525/241

(58) Field of Search ................................. 525/191, 213, 525/222, 232, 233, 238, 240, 241

(56) References Cited

U.S. PATENT DOCUMENTS

| 3,336,173 | A | 8/1967 | Benfroe | 156/148 |
|---|---|---|---|---|
| 4,273,894 | A | 6/1981 | Mucke et al. | 525/228 |
| 4,728,566 | A | 3/1988 | Lancaster et al. | 428/286 |
| 5,457,146 | A | 10/1995 | Ogoe et al. | 524/409 |
| 5,852,118 | A | 12/1998 | Horrion et al. | 525/90 |
| 6,326,084 | B1 | 12/2001 | Ouhadi et al. | 428/474.7 |

FOREIGN PATENT DOCUMENTS

| EP | 0 028 106 A1 | 5/1981 |
|---|---|---|
| EP | 0 569 746 A1 | 11/1993 |

*Primary Examiner*—Nathan M. Nutter
(74) *Attorney, Agent, or Firm*—William A. Skinner; William G. Muller

(57) ABSTRACT

The present invention relates to a high-frequency weldable thermoplastic rubber composition, to a method of rendering non-polar thermoplastic rubbers high-frequency weldable, to a high-frequency weldable shaped article obtainable from the composition according to the invention, to a method for manufacturing said shaped articles and to a method of high-frequency welding of said articles. Furthermore, the present invention relates to shaped high-frequency welded articles obtainable by the method according to the present invention.

13 Claims, No Drawings

US 6,825,277 B2

HIGH-FREQUENCY WELDING OF NON-POLAR THERMOPLASTIC RUBBERS

FIELD OF THE INVENTION

The present invention relates to a high-frequency weldable thermoplastic rubber composition, to a method of rendering non-polar thermoplastic rubbers high-frequency weldable, to a high-frequency weldable shaped article obtainable from the composition according to the invention, to a method for manufacturing said shaped articles and to a method of high-frequency welding of said articles. Furthermore, the present invention relates to shaped high-frequency welded articles obtainable by the method according to the present invention.

Shaped articles of conventional thermoplastic rubber compositions comprising a thermoplastic polyolefin homopolymer or copolymer and an olefinic rubber which is fully crosslinked, partially crosslinked or not crosslinked and/or block-copolymer of styrene/conjugated diene/styrene and/or its hydrogenated derivative, optionally in the presence of common additives can only be adhered together by using adhesives or they must be heat welded by the hot air or hot plate method. Conventional adhesion methods are disadvantageous in terms of the need to modify the adhering surface, (for instance, by priming, corona treatment, etching, etc.), selecting the suitable adhesive, etc. Additionally, the hot air and hot plate method can only be carried out at a relatively slow speed. Furthermore, the temperature resulting in an acceptable welding without burning or scorching the surface is difficult to be controlled.

In many sheeting applications the sheets are formed, cut to shape and assembled to make the final part, such as, for example chemical protective suits, inflatable boats, inflatable containers and roofing articles. In the assembly of sheet materials, a preferred method is high-frequency welding due to speed and complexity of the shape to be welded. High-frequency welding is, however, not feasible with those thermoplastic elastomers due to their lack in polarity. However, there is a need in the industry to render those thermoplastic elastomers weldable by the high-frequency welding method.

DESCRIPTION OF THE RELATED ART

U.S. Pat. No. 4,728,566 pertains to a composite article comprising a polymer foam having HF-bonded thereto at least one surface layer, wherein the HF-bonding is effected by a layer of HF-bondable polymer film between said foam and said surface layer, said HF-bondable polymer film comprising a carbon monoxide-containing olefin interpolymer and said polymer foam being selected from the group consisting of various foamed polymers. The surface layer is selected from the group comprising polymers, fabrics, leather, cellulosic products, wood, vitreous materials, metal foils, paper and foams and the HF-bondable polymer film comprises at least one of copolymer of ethylene and carbon monoxide (ECO), copolymer of ethylene, carbon monoxide and acrylic acid (ECOAA), copolymer of ethylene, carbon monoxide and methacrylic acid (ECOMAA) and copolymer of ethylene, carbon monoxide and vinyl acetate (ECOVA).

U.S. Pat. No. 2,667,437 discloses a method to heat-weld two non-polar, unmodified thermoplastics by exposing them to a pair of hot electrodes which are covered with a fixed conductive polymer.

U.S. Pat. No. 4,268,388 pertains to almost the same welding-method as disclosed in U.S. Pat. No. 2,667,437.

U.S. Pat. No. 3,336,173 discloses the addition of a polyamide to non-polar thermoplastics in order to obtain a HF-weldable product without taking into consideration the very poor properties of such a blend due to the lack of compatibility between the non-polar thermoplastic and the polar polyamide.

EP-A-0,028,106 discloses the use of a special bituminous petroleum derivative as a HF-welding promoter in chlorinated PE/chlorosulfonated PE.

U.S. Pat. No. 6,326,084 describes a method of high-frequency welding of non-polar thermoplastic elastomers characterized in that said elastomers comprise a polar modifier selected from functionalized polyolefins or functionalized block-copolymers of styrene/conjugated diene/styrene.

U.S. Pat. No. 4,273,894 discloses thermoplastic compositions for the manufacture of transparent, weldable and flexible articles which composition essentially consists of 60 to 95% by weight of at least one chlorinated polyolefin and 5 to 40% by weight of at least one copolymer of butadiene, styrene and an acrylic acid or a metacrylic acid ester.

SUMMARY OF THE INVENTION

It is an object of the present invention to render non-polar thermoplastic rubbers which are weldable by high-frequency welding techniques while maintaining good elastic properties such as Shore A in the range of about 20 to about 95, preferably about 35 to about 90.

It is a further object to provide a method for welding of thermoplastic elastomers without impairing its elastic properties.

It is a third object of the present invention to provide shaped articles having improved properties.

These and further objects become evident from the description of the invention.

In a first embodiment the present invention relates to a modified thermoplastic rubber composition comprising
(A) a thermoplastic rubber comprising
 (i) a rubber; and
 (ii) a thermoplastic polyolefin homopolymer or copolymer; and
(B) a polar modifier in an amount effective to render said thermoplastic rubber composition high-frequency weldable, wherein the polar modifier is selected from the group consisting of
 (a) thermoplastic polyurethane resins, in an amount of at least about 25 wt.-%, based on the total amount of thermoplastic rubber (A) and thermoplastic polyurethane resin (a);
 (b) chlorinated polyolefin resins;
 (c) copolymers of ethylene and vinyl acetate;
 (d) terpolymers of styrene, butadiene and acrylonitrile; and
 (e) mixtures thereof.

In a second embodiment the present invention relates to a method of rendering a thermoplastic rubber (A) comprising
(i) a rubber; and
(ii) a thermoplastic polyolefin homopolymer or copolymer;
high-frequency weldable by addition of an effective amount of a polar modifier (B) selected from the group consisting of
(a) thermoplastic polyurethane resins, in an amount of at least 25 wt.-%, based on the total amount of thermoplastic rubber (A) and thermoplastic polyurethane resin (a);

(b) chlorinated polyolefin resins;
(c) copolymers of ethylene and vinyl acetate;
(d) terpolymers of styrene, butadiene and acrylonitrile; and
(e) mixtures thereof.

In a third embodiment the present invention relates to a high-frequency (HF) weldable shaped article comprising in a blend a thermoplastic rubber (A) comprising
  (i) a rubber; and
  (ii) a thermoplastic polyolefin homopolymer or copolymer; and
an effective amount of a polar modifier (B) selected from the group consisting of
  (a) thermoplastic polyurethane resins, in an amount of at least 25 wt.-%, based on the total amount of thermoplastic rubber (A) and thermoplastic polyurethane resin (a);
  (b) chlorinated polyolefin resins;
  (c) copolymers of ethylene and vinyl acetate;
  (d) terpolymers of styrene, butadiene and acrylonitrile; and
  (e) mixtures thereof.

In a fourth embodiment the present invention relates to a method for manufacturing a high-frequency (HF) weldable shaped article comprising the steps of
blending
  (A) a thermoplastic rubber comprising
    (i) a rubber; and
    (ii) a thermoplastic polyolefin homopolymer or copolymer;
with an effective amount of
  (B) a polar modifier selected from the group consisting of
    (a) thermoplastic polyurethane resins, in an amount of at least 25 wt.-%, based on the total amount of thermoplastic rubber (A) and thermoplastic polyurethane resin (a);
    (b) chlorinated polyolefin resins;
    (c) copolymers of ethylene and vinyl acetate;
    (d) terpolymers of styrene, butadiene and acrylonitrile; and
    (e) mixtures thereof
and
forming the resulting thermoplastic rubber composition into the shaped article.

In a fifth embodiment the present invention relates to a method of bonding surfaces of the shaped articles as defined above comprising the steps of contacting the respective surfaces of said shaped articles to be welded together and subjecting said surfaces to high-frequency (HF) welding conditions.

In a sixth embodiment the present invention relates to a shaped welded article obtainable by the HF-welding method described above.

Alternative or preferred embodiments of the present invention become apparent from the dependent claims and the description which follows.

The thermoplastic elastomer compositions according to the present invention facilitate the manufacturing of welded articles of non-polar thermoplastic rubbers having complex shapes which welded articles have high mechanical stability, high tear resistance and weld-strength within the weld of up to about 20, preferably about 25, more preferably about 30 N/cm.

DETAILED DESCRIPTION OF THE INVENTION

Thermoplastic Rubber (A)

The thermoplastic rubber (elastomer) composition used according to the present invention as component (A) has a combination of both thermoplastic and elastic properties (thermoplastic elastomer or "TPE"). In general the thermoplastic rubber (A) itself has a poor HF-weldability due to it being non-polar or very low in polarity. It is generally obtained by blending a thermoplastic polyolefin with an elastomer (rubber) in a way such that the elastomer is intimately and uniformly dispersed as a discrete particulate phase within a continuous phase of the thermoplastic polyolefin.

Early work with vulcanized compositions is found in U.S. Pat. No. 3,037,954 to Gessler which discloses static vulcanization as well as the technique of dynamic vulcanization wherein a vulcanizable elastomer is dispersed into a resinous thermoplastic polymer and the elastomer is cured while continuously mixing and shearing the polymer blend. The resulting composition (thermoplastic elastomer vulcanizate "TPV") is a microgel dispersion of cured elastomer, such as butyl rubber, chlorinated butyl rubber, polybutadiene, polyisobutene etc. in an uncured matrix of thermoplastic polymer, such as polypropylene.

Accordingly the thermoplastic rubber component (A) may generally be prepared by mixing
  i. an uncured rubber, and
  ii. a thermoplastic polyolefin homopolymer or copolymer and; optionally
  iii. conventional additives and fillers;
then melting the mixture by kneading until a homogeneous blend is obtained. The addition of curing agents (also referred to as curatives, crosslinking- or vulcanizing agents) to the blend during the mixing under conditions of heat and shear results in a composition of a fully cured (also referred to as fully vulcanized or fully crosslinked) rubber dispersed in a thermoplastic matrix.

The term "rubber" as defined in ASTM D1566-02 and used herein means any natural or synthetic polymer that is capable of recovering from large deformations quickly and forcibly. For the purpose of this invention the term "elastomer" is used interchangeably with the term "rubber".

In terms of the present invention the terms "non-polar thermoplastic elastomer" or "non-polar thermoplastic elastomer composition" means the thermoplastic elastomeric polymeric composition including optional additives.

The term "fully cured" in conjunction with the dynamically cured rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of gel content or, conversely, extractable components. Alternatively, the degree of cure can be expressed in terms of cross-link density. Where the determination of extractables is an appropriate measure of the state of cure, the improved thermoplastic elastomeric compositions are produced by vulcanizing the curable rubber component of the blends to the extent that the composition contains, with increasing preference in the order given, no more than about 1 to 4, preferably 2 to 3 wt.-% of the cured rubber component extractable at room temperature by a solvent which dissolves the rubber which is intended to be vulcanized. In general, the less extractables the cured rubber component contains, the better the properties of the TPE are. It follows that compositions comprising essentially no extractable rubber from the cured rubber phase are highly preferable. In terms of the present invention the term "no extractable" means less than about 0.5 percent by weight, ideally about 0 percent by weight extractables. Gel content, reported as percent gel is determined by a procedure which comprises determining the amount of insoluble polymer by soaking the specimen for about 48 hours in an organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the TPV which it is not intended to cure. Any insoluble pigments, fillers, etc., are subtracted from both the initial and final weights.

Measurement of Gel Content

A sample of a thermoplastic elastomer composition of about 100 g is weighed and cut into fine fragments (size: 0.5 mm×0.5 mm×0.5 mm). In a closed vessel, the sample is immersed in 30 ml of cyclohexane at 23° C. for 48 hours. Then, the sample is taken out, placed on a filter paper and dried at room temperature for not less than 72 hours until a constant weight is reached. From the weight of the dry residue, the weight of all the cyclohexane-insoluble components (e.g. fibrous filler, filler, pigment) other than the polymer component is subtracted. The obtained value is taken as "corrected final weight (Y)". On the other hand, from the sample weight, the weight of the cyclohexane-soluble components (e.g., softener) other than the polymer component and the weight of the cyclohexane-insoluble components (e.g., fibrous filler, filler, pigment) are subtracted. The obtained value is taken as "corrected initial weight (X)". The gel content (content of the cyclohexane-insoluble components) is calculated by the following equation.

$$\text{Gel-Content [wt.-\%]} = \frac{Y}{X} \cdot 100$$

According to the present invention said thermoplastic rubber (A) is not limited to any Shore A hardness. In a preferred embodiment of the invention thermoplastic rubber (A) has a Shore A hardness from about 20 to about 95, preferably from about 35 to about 60, most preferably about 35 to about 50 (as measured according to ASTM D2240-02 @ 5 seconds delay).

In a preferred embodiment the thermoplastic rubber (A) has an LCR-viscosity (laboratory capillary rheometer; entrance angle: 180°; barrel diameter: 9.55 mm; heat soak time: 6 min; apparent shear rate [LCR] range: 730 to 5500 1/s, apparent viscosity [LCR] range of calibration standards: 5 to 800 Pa·s) of about 20 to about 100 Pa·s, preferably about 55 to about 85 Pa·s, and in a specific embodiment about 68 Pa·s.

For preparing the thermoplastic rubber composition used as the component (A) in the composition according to the present invention the rubber (i) is mixed with the thermoplastic polyolefin homo- or copolymer (ii) at a temperature sufficient to soften the resin or, more commonly, at a temperature above its melting point where the resin is crystalline at room temperature. After the resin and rubber are intimately mixed, the curative is added. Heating and masticating with shearing at vulcanization temperatures are generally adequate to complete vulcanization in about 0.5 to about 10 minutes. The curing time can be reduced by elevating the curing temperature. A suitable range of curing temperatures is from about the peak melting point of the resin (about 130° C. for HDPE and about 165° C. for PP) to about 250° C. More typically, the temperature range is from about 160° C. to about 225° C. Preferably the vulcanization is carried out at a temperature ranging from about 170° C. to about 200° C.

Dynamic vulcanization is effected by mixing the thermoplastic and elastomer components at an elevated temperature in conventional mixing equipment such as roll mills, Banbury mixers, Brabender mixers, continuous mixers, mixing extruders and the like. The compositions may be processed and reprocessed by conventional plastic processing techniques such as extrusion, injection-molding, blown and cast film, blow-molding, compression-molding and thermoforming.

Exemplary thermoplastic rubber compositions, suitable in conjunction with the present invention are available from Advanced Elastomer Systems under the trade designation Santoprene® and Vistaflex®.

In the following the individual constituents of the thermoplastic rubber component (A) are described in more detail.

Rubber (i)

Illustrative, non-limiting examples of rubbers (i) suitable for use as the thermoplastic rubber (A) include rubbers selected from the group consisting of ethylene/alpha-olefin/non-conjugated diene copolymer rubbers, such as ethylene-propylene/non-conjugated diene rubber (EPDM), ethylene/alpha-olefin copolymer rubber wherein the alpha-olefin is of the formula $CH_2=CHR$ and wherein R is a straight or branched alkyl group having 1 to 12 carbon atoms such as propylene, 1-butene, isobutylene, 1-pentene, 1-hexene, 1-heptene, 1-octene, 3-methyl-1-pentene, 4-methyl-1-pentene, 5-methyl-1-hexene, and the like. A preferred ethylene/alpha-olefin rubber is ethylene/propylene copolymer rubber (EPM). Further alternative examples of rubbers are butyl rubber, copolymers of $C_4$ to $C_7$ isomonoolefins and para-alkylstyrene, natural or synthetic rubbers, polyisoprene rubber, polybutadiene rubber, styrene/butadiene copolymer rubbers and blends thereof.

The curable or vulcanizable rubbers which can be used in the practice of this invention include both synthetic and natural rubbers; at least one of the rubbers utilized must be vulcanizable.

While polyisobutylene (PIB) is not a true rubber because it cannot be vulcanized, it can be utilized in the practice of this invention in conjunction with a vulcanizable rubber provided that the PIB has a viscosity average molecular weight of about 40,000 to about one million.

The term "nitrile rubber" means an acrylonitrile copolymer rubber. Suitable nitrile rubbers comprise rubbery polymers of 1,3-butadiene or isoprene and acrylonitrile. Preferred nitrile rubbers comprise polymers of 1,3-butadiene and about 20 to 50 wt.-% acrylonitrile. Any nitrile rubber which is a "solid" rubber having an average molecular weight of at least 50,000, and preferably between about 100,000 to 1,000,000 can be used. Commercially available nitrile rubbers suitable for the practice of the invention are described in Rubber World Blue Book, 1980 Edition, Materials and Compounding Ingredients for Rubber, pages 386–406.

Butyl rubber is a copolymer of an isoolefin and a conjugated multiolefin. The useful rubber copolymers comprise a major portion of isoolefin and a minor amount, preferably not more than about 30 wt.-%, of a conjugated multiolefin. The preferred rubber copolymers comprise about 85 to 99.5 wt.-% (preferably about 95 to 99.5 wt.-%) of a $C_4$ to $C_7$ isoolefin, such as isobutylene, and about 15 to 0.5 wt.-% (preferably about 5 to 0.5 wt %) of a multiolefin of about 4 to 14 carbon atoms. These copolymers are referred to in the literature as "butyl rubber."

The term "butyl rubber" as used herein includes the aforementioned copolymers of an isoolefin having 4 to 7 carbon atoms and about 0.5 to 20 wt.-% of a conjugated multiolefin of about 4 to 14 carbon atoms. Preferably these copolymers contain about 0.5 to about 5% conjugated multiolefin. The preferred isoolefin is isobutylene. Suitable conjugated multiolefins include isoprene, butadiene, dimethyl butadiene, piperylene, etc. Commercial butyl rubber is a copolymer of isobutylene and minor amounts of isoprene.

In a preferred embodiment of the invention the rubber (i) is an ethylene/alpha-olefin copolymer rubber or ethylene/alpha-olefin/non-conjugated diene copolymer rubber, the latter being most preferred.

The non-conjugated diene monomer can be a straight chain, branched chain or cyclic hydrocarbon diene having from about 6 to about 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,3-cyclopentadiene; 1,4-cyclohexadiene; 1,5-cyclooctadiene and 1,5-cyclododecadiene; and multi-ring alicyclic fused and bridged ring dienes such as tetrahydroindene, methyl tetrahydroindene, dicyclopentadiene; bicyclo-(2,2,1)-hepta-2,5-diene; alkenyl-, alkylidene-, cycloalkenyl- and cycloalkylidene norbornenes such as 5-methylene-2-norbornene (MNB); 5-propenyl-2-norbornene, 5-isopropylidene-2-norbornene; 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

The ethylene/alpha-olefin/non-conjugated diene rubber contains from about 40 to about 85 wt.-% of ethylene, preferably from about 45 to about 80 wt.-%, and more preferably in the range of from about 50 to about 75 wt.-%, based on the ethylene/alpha-olefin/non-conjugated diene rubber. The ethylene/alpha-olefin/non-conjugated diene rubber contains from about 0.25 to about 5 wt.-% of diene, preferably from about 0.25 to about 2 wt.-% and more preferably in the range of from about 0.5 to about 1.2 wt.-%. The balance of the ethylene, alpha-olefin, non-conjugated diene elastomeric polymer to about 100 percent will generally be made up of an alpha-olefin which is selected from the group consisting of propylene, 1-butene, 1-hexene, 4-methyl-1-pentene, 1-octene, 1-decene and combinations thereof, and the like. The ethylene/alpha-olefin/non-conjugated diene rubber which is preferred according to this invention contains propylene as the alpha-olefin and 5-vinyl-2-norbornene as the diene comonomer.

In the thermoplastic rubber component (A) the amount of rubber (i) generally ranges from about 95 to about 10 wt.-%, based on the weight of the rubber (i) and thermoplastic resin (ii). Preferably, the rubber content will be in the range of from about 80 to about 20 wt.-% of total polymer.

Thermoplastic Polyolefin Homopolymer or Copolymer (ii)

The term "thermoplastic polyolefin" as used herein in conjunction with the description of the thermoplastic elastomer component (A) denotes any polyolefin resin which exhibits thermoplastic properties.

A wide range of thermoplastic resins and/or their mixtures have been used in the preparation of thermoplastic elastomers, including polypropylene (PP), polypropylene copolymers, HDPE, LDPE, VLDPE, LLDPE, polyethylene copolymers, cyclic olefin homopolymers or copolymers as well as olefinic block copolymers, polystyrene, polyphenylene sulfide, polyphenylene oxide and ethylene propylene copolymer (EP) thermoplastics.

Thermoplastic resins useful in the compositions according to the invention include crystalline and semi-crystalline polyolefin homopolymers and copolymers. They are desirably prepared from mono-olefin monomers, preferably those having about 2 to about 20, more preferably about 2 to about 12, most preferably about 2 to about 7 carbon atoms, such as ethylene, propylene, 1-butene, isobutylene, 1-pentene, 1-hexene, 1-heptene, 1-octene, 3-methyl-1-pentene, 4-methyl-1-pentene, 5-methyl-1-hexene, mixtures thereof and copolymers thereof with vinyl acetate or (meth) acrylates, such as methyl-, ethyl-, propyl- or butyl-(meth) acrylates with methyl (meth)acrylates being preferred.

A preferred thermoplastic copolymer (ii) is an ethylene vinyl acetate (EVA) copolymer having an effective vinyl acetate (VA) content of about 14 to 50 wt.-%, preferably about 18 to 40 wt.-%, more preferably about 25 to 30 wt.-%.

In conjunction with the present invention the term "effective vinyl acetate content" means the content of vinyl acetate of the copolymer which has been determined by FTIR according to ISO 8985: 1998.

As used in the specification and claims the term "polypropylene" includes homopolymers of propylene as well as reactor copolymers of polypropylene (PPRC) which can contain about 1 to about 20 wt.-% of ethylene or an alpha-olefin comonomer of about 4 to about 20 carbon atoms, and mixtures thereof. The polypropylene can be atactic, isotactic or syndiotactic, made with Ziegler-Natta or metallocene catalysts. The PPRC can be either a random or block copolymer. The density of the PP or PPRC can be from about 0.88 to about 0.92 g/cm$^3$; generally, from about 0.89 to about 0.91 g/cm$^3$. Commercially available polyolefins may be used in the practice of the invention. Blends of thermoplastic resins may also be used.

The preferred polyolefin resins are high density polyethylene (HDPE) and polypropylene. While other polyolefin homopolymers and copolymers of ethylene can be utilized in the practice of this invention, the resulting TPE compositions are deficient in high temperature characteristics. Such other polyolefins include low density polyethylene (LDPE), very low density polyethylene (VLPE), linear low density polyethylene (LLDPE) and polybutylene (PB). However, these other polyolefin resins can be incorporated into the thermoplastic elastomer composition (a) of this invention along with the polypropylene (PP) or high density polyethylene.

High density polyethylene, which is one of the preferred polyolefin resins of this invention, has a density of about 0.941 to about 0.965 g/cm$^3$. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

The term "low density polyethylene" or "LDPE" as used herein means both low and medium density polyethylene having densities of about 0.910 to about 0.940 g/cm$^3$. The terms include linear polyethylene as well as copolymers of ethylene which are thermoplastic resins.

The term "very low density polyethylene" or "VLDPE" is used herein to mean polyethylene having a density below about 0.910 g/cm$^3$ and includes linear polyethylene as well as copolymers of ethylene which are thermoplastic resins.

Linear low density polyethylene (LLDPE) is a class of low density polyethylene characterized by little, if any, long chain branching derived from $C_3$ to $C_{12}$ alpha-olefins selected from the group consisting of propylene, 1-butene, 1-hexene, 1-octene, 4-methyl-1-pentene; preferably 1-butene or 1-hexene. The processes for producing LLDPE are well known in the art and commercial grades of this polyolefin resin are available. Generally, it is produced in gas-phase fluidized bed reactors or liquid-phase solution process reactors; the former process can be carried out at pressures of about 0.69 to 2.07 MPa (100 to 300 psi) and temperatures as low as about 100° C.

The amount of thermoplastic polyolefin (ii) found to provide useful compositions (A) is generally from about 5 to about 90 wt.-%, based on the weight of the rubber (i) and thermoplastic polyolefin resin (ii). Preferably, the thermoplastic resin content will range from about 20 to about 80 percent by weight of the total polymer.

Conventional Fillers and Additives (iii)

The solid particulate component which may be added to the thermoplastic elastomeric composition of the present invention after it has been subjected to dynamic vulcanization under conditions to cure the elastomer to the extent desired comprised in the composition sufficiently to prevent penetration of at least a major portion of the solid particulate component into the elastomer may be a filler/fillers, certain additive(s) or mixtures thereof.

In a preferred embodiment fillers are added and mixed into the blend after vulcanization is achieved. This ensures that in the fully vulcanized DVA the fillers and/or additives will be retained in the thermoplastic phase because they will not be able to penetrate into the cross-linked elastomer phase. However, depending upon the degree to which it is desirable to have some of the filler and/or additive incorporated into the elastomer phase, the fillers and/or additives may be added at the desired level of partial cure of the elastomer phase. As an alternative to the above process, the DVA product may be produced without fillers or additives. The fillers and/or additives may then be added in a later second compounding operation.

Generally adding fillers and/or additives is conventional in the art of rubber compounding. Suitable additives are selected from the group consisting of pigments, antistatic agents, antioxidants, ultraviolet light stabilizers, antiblocking agents, lubricants, processing oils, waxes, coupling agents for fillers and mixtures thereof. The term "filler" as used herein refers to non-reinforcing fillers, reinforcing fillers, organic fillers and inorganic fillers. The fillers may be organic fillers and inorganic fillers (e.g., mineral fillers). Preferably, the filler is an inorganic filler. Suitable fillers include talc, silica, clays, solid flame retardants, calcium carbonate, titanium dioxide, barium sulfate, carbon black, other mineral fillers, and mixtures thereof. The carbon black can be derived from any source and be any type of carbon black such as channel blacks, furnace blacks, thermal blacks, acetylene black, lamp black and the like. Any effective amount of filler may be added. Typically, the filler may be added in an amount of up to about 60 wt.-%, preferably ranging from about 2 to about 50 wt.-% based on the total thermoplastic dynamically vulcanized composition (A). For specific fillers, these proportions may vary. Carbon black, for instance, is preferably added in an amount ranging from about 1 to about 40 wt.-%, more preferably from 2 to 20 wt.-%, based on the composition (A).

It will be understood that for a particular application, the effective amount of filler or additive may well be outside of these ranges. Since the invention concentrates the filler in the thermoplastic phase where it is most needed in the case of reinforcing fillers, a reduction in the quantity of filler to be added may be expected for maintaining the same strength desired.

The suitable additives for the practice of the invention may be added in an amount ranging from about 0.05 to about 5 wt.-%, preferably from about 0.05 to about 3 wt.-%, based on the total amount of the composition. When the suitable additive is an ultraviolet light stabilizer, the ultraviolet light stabilizer may be present in an amount ranging from about 0.05 to about 1.0 wt.-%, based on the total amount of the thermoplastic rubber (A).

The term "ultra-violet light stabilizer" (UV stabilizer, typically a particulate solid at standard temperature and pressure having a molecular weight of at least about 1,000, preferably, at least about 5,000) is used herein to denote compounds which provide stabilization or protection from the degrading effects of ultra-violet light on TPV compositions. The UV stabilizers do not adversely affect the TPV compositions of the present invention. It has been found that addition of UV stabilizers to TPV compositions can significantly decrease the crosslinking performance of curatives utilized for halobutyl elastomer materials. Such decrease does not occur to the same extent when the curative system is a maleimide curative system. Suitable UV stabilizers include hindered amine light stabilizers (HALS) which belong to a class of compounds referred to as "hindered amines." These hindered amines have been found to be effective in stabilizing polymers. See, for example, U.S. Pat. No. 4,064,102 the teachings of which are hereby incorporated by reference. Preferred UV stabilizers are the 2,2,4,4-tetramethylpiperidine derivatives such as N,N-bis(2,2,6,6-tetramethyl-4piperidinyl)-1,6-hexanediamine, bis(2,2,6,6-tetra-methyl-4-piperidinyl)decane-dioate, and the reaction product of dimethyl succinate plus 4-hydroxy-2,2,6,6-tetramethyl-1-piperidine-ethanol sold by Ciba-Geigy Corporation under the tradenames Chimassorb® 944LD, Tinuvin® 770, and Tinuvin® 622LD, respectively. The effective amount of UV stabilizer added will depend upon the particular stabilizer used and the degree of protection desired. The HALS is employed at about 0.01 to 0.5 wt % of the composition (A), preferably from about 0.02 to 0.25 wt %, and most preferably from about 0.03 to 0.15 wt %, based on composition (A).

When UV stabilizers are used, it is preferred that the blends be dynamically vulcanized in the presence of a maleimide cure system although other cure systems discussed below are also useful. The maleimide compound preferably used in the invention is a bismaleimide compound. Among the maleimide compounds, a bismaleimide compound is especially superior in effectiveness and m-phenylene bismaleimide (4,4' m-phenylene bismaleimide) is preferred. Examples of the bismaleimide are 4,4'-vinylenediphenyl bismaleimide, p-phenylene bismaleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, m-phenylene bismaleimide (HVA-2), hexamethylene bismaleimide and 3,6-purine bismaleimides.

Rubber process oils have particular ASTM designations depending on whether they fall into the class of paraffinic, naphthenic or aromatic process oils. They are derived from petroleum fractions. The type of process oil utilized will be that customarily used in conjunction with the rubber component. The ordinarily skilled rubber chemist will recognize which type of oil which should be utilized with a particular rubber. The quantity of rubber process oil utilized is based on the total rubber content, both cured and uncured, and can be defined as the ratio, by weight, of process oil to the total rubber in the TPE. This ratio may range from about above 0 to about 1.5/1, preferably about 0.2/1 to about 1.0/1; more preferably about 0.3/1 to about 0.8/1. Larger amounts of process oil can be used, the deficit being reduced physical strength of the composition. Oils other than petroleum based oils, such as oils derived from coal tar and pine tar, can also be utilized. In addition to the rubber process oils, organic esters and other synthetic plasticizers may be used.

Antioxidants can be added to the rubber composition (A). The particular antioxidant utilized will depend on the rubbers utilized as can synthetic oils such as isoparaffinic oil and more than one type may be required. Their proper selection is well within the ordinary skill of the rubber processing chemist. Antioxidants will generally fall into the class of chemical protectors or physical protectants.

Physical protectants are used where there is to be little movement in the part to be manufactured from the composition. These are generally waxy materials which impart a "bloom" to the surface of the rubber part and form a protective coating to shield the part from oxygen, ozone, etc.

The chemical protectors generally fall into three chemical groups: secondary amines, phenolics and phosphites. Examples of these types of antioxidants useful in the practice of this invention are hindered phenols, amino phenols, hydroquinones, alkyldiamines, amine condensation products, etc.

Examples for the antioxidants include phenol-based antioxidants, amine-based antioxidants, sulfur-based oxidants, and the like. Examples of the phenol-based antioxidant include 2,6-di-tert-butylphenol (hereinafter "tert-butyl" is referred to as "t-butyl"), 2,6-di-t-butyl-p-cresol, 2,6-di-t-butyl-4-methylphenol, 2,6-di-t-butyl-4-ethylphenol, 2,4-dimethyl-6-t-butylphenol, 4,4'-methylenebis(2,6-di-t-butylphenol), 4,4'-bis(2,6-di-t-butylphenol), 4,4'-bis(2-methyl-6-t-butylphenol), 2,2'-methylenebis(4-methyl-6-t-butyl-phenol), 2,2'-methylenebis(4-ethyl-6-t-butylphenol), 4,4'-butylidenebis(3-methyl-6-t-butylphenol), 4,4'-isopropylidene bis(2,6-di-t-butylphenol), 2,2'-methylenebis (4-methyl-6-cyclohexylphenol), 2,2'-methylene-bis(4-methyl-6-nonylphenol), 2,2'-isobutylidenebis(4,6-dimethylphenol), 2,6-bis(2'-hydroxy-3'-t-butyl-5'-methylbenzyl)-4-methylphenol, 3-t-butyl-4-hydroxy anisole, 2-t-butyl-4-hydroxy anisole, 3-(4-hydroxy-3,5-di-t-butylphenyl)stearyl propionate, 3-(4-hydroxy-3,5-di-t-butylphenyl)oleyl propionate, 3-(4-hydroxy-3,5-di-t-butylphenyl)dodecyl propionate, 3-(4-hydroxy-3,5-di-t-butylphenyl)decyl propionate, 3-(4-hydroxy-3,5-di-t-butylphenyl)octyl propionate, tetrakis{3-(4-hydroxy-3,5-di-t-butylphenyl)propionyloxy-methyl}methane, 3-(4-hydroxy-3,5-di-t-butylphenyl)glycerin propionate monoester, an ester of 3-(4-hydroxy-3,5-di-t-butylphenyl) propionate and glycerin monooleyl ether, 3-(4-hydroxy-3,5-di-t-butylphenyl)butylene propionate glycolate ester, 3-(4-hydroxy-3,5-di-t-butylphenyl)propionate thiodiglycolate ester, 4,4'-thiobis(3-methyl-6-t-butylphenol), 4,4'-thiobis(2-methyl-6-t-butylphenol), 2,2'-thiobis(4-methyl-6-t-butylphenol), 2,6-di-t-butyl-.alpha.-dimethylamino-p-cresol, 2,6-di-t-butyl-4-(N,N'-dimethyl-aminomethyl-phenol), bis(3,5-di-t-butyl-4-hydroxy benzyl)sulfide, tris{(3,5-di-t-butyl-4-hydroxyphenyl)propionyl-oxyethyl}isocyanurate, tris(3,5-di-t-butyl-4-hydroxyphenyl)isocyanurate, 1,3,5-tris(3,5-di-t-butyl-4-hydroxybenzyl)isocyanurate, bis{2-methyl-4-(3-n-alkylthiopropionyloxy)-5-t-butylphenyl}sulfide, 1,3,5-tris (4-t-butyl-3-hydroxy-2,6-dimethyl-benzyl)isocyanurate, tetraphthaloyl-di(2,6-dimethyl-4-t-butyl-3-hydroxy-benzyl sulfide), 6-(4-hydroxy-3,5-di-t-butylanilino)-2,4-bis (octylthio)-1,3,5-triazine, 2,2-thio-{diethyl-bis-3-(3,5-di-t-butyl-4-hydroxyphenyl)}-propio-nate, N,N'-hexamethylenebis(3,5-di-t-butyl-4-hydroxy-hydrocinnamido), 3,5-di-t-butyl-4-hydroxy-benzyl-phosphate diester, bis(3-methyl-4-hydroxy-5-t-butylbenzyl) sulfide, 3,9-bis[1,1-dimethyl-2-{.beta.-(3-t-butyl-4-hydroxy-5-methylphenyl)-propionyloxy}ethyl]-2,4,8,10-tetraoxa-spiro[5,5]undecane, 1,1,3-tris(2-methyl-4-hydroxy-5-t-butylphenyl)butane, 1,3,5-trimethyl-2,4,6-tris (3,5-di-t-butyl-4-hydroxybenzyl)benzene, bis{3,3'-bis-(4'-hydroxy-3,3'-t-butylphenyl)-butyric acid}glycolate ester, and the like.

Examples of the amine-based antioxidant include naphthylamine-based antioxidants such as 1-naphthylamine, phenyl-1-naphthylamine, p-octylphenyl-1-naphthylamine, p-nonylphenyl-1-naphthylamine, p-dodecylphenyl-1-naphthylamine, phenyl-2-naphthylamine; phenylenediamine-based antioxidants such as N,N'-diisopropyl-p-phenylenediamine, N,N'-diisobutyl-p-phenylenediamine, N,N'-diphenyl-p-phenylenediamine, N,N'-di-p-naphtyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, phenyloctyl-p-phenylenediamine; diphenylamine-based antioxidants such as dipyridylamine, diphenylamine, p,p'-di-n-butylphenyl-amine, p,p'-di-t-butyldiphenylamine, p,p'-di-t-pentyldiphenylamine, p,p'-dinonyldiphenylamine, p,p'-didecyldiphenylamine, p,p'-didodecyldiphenylamine, p,p'-distyryldiphenylamine, p,p'-dimethoxydiphenylamine, 4,4'-bis(4-alpha,alpha-dimethylbenzoyl)diphenylamine, p-isopropoxydiphenyl-amine, dipyridylamine; and phenothiazine-based antioxidants such as phenothiazine, N-methylphenothiazine, N-ethylphenothiazine, 3,7-dioctyl-phenothiazine, phenothiazine carboxylate ester, and phenoselenazine.

Examples of the sulfur-based antioxidant include dioctylthiodipropionate, didecylthiodipropionate, dilaurylthiodipropionate, dimyristylthiodipropionate, distearylthiodipropionate, laurylstearylthiodipropionate, dimyristylthiodipropionate, distearyl-β,β-thiodibutylate, (3-octylthiopropionic acid)pe-ntaerythritol tetraester, (3-decylthiopropionic acid)pentaerythritol tetraester, (3-laurylthiopropionic acid)pentaerythritol tetraester, (3-stearylthiopropionic acid)pentaerythritol tetraester, (3-oleylthiopropionic acid)pentaerythritol tetraester, (3-laurylthiopropionic acid)-4,4'-thiodi(3-methyl-5-t-butyl-4-phenol)ester, 2-mercaptobenzimidazole, 2-mercapto-methylbenzimidazol, 2-benzimidazoldisulfide, dilaurylsulfide, amylthio-glycolate, and the like.

The physical antioxidants include mixed petroleum waxes and microcrystalline waxes. All or a portion of the fillers and/or additives can be added before the dynamic vulcanization step, after partial but before the dynamic vulcanization step or after the dynamic vulcanization step.

In the thermoplastic rubber composition (A) the rubber component may be uncured, at least partially cured, or fully cured. Preferably the rubber is fully cured.

Those of ordinary skill in the art will appreciate the appropriate quantities, types of cure systems and vulcanization conditions required to carry out the full vulcanization of the rubber. The rubber can be vulcanized using varying amounts of curative, varying temperatures and varying time of cure in order to obtain the optimum full crosslinking desired. Any known cure system can be used, so long as it is suitable under the vulcanization conditions for the rubber being used and is compatible with the thermoplastic polyolefin resin component of the TPV. These curatives include sulfur, sulfur donors, metal oxides, resin systems, high energy radiation and the like, both with and without accelerators and co-agents. In a further prefered alternative of the present invention crosslinking can also be effected by hydrosilylation crosslinking as disclosed in EP-A-0776937. Organic peroxides with an adequate well-known co-agent can be used as cure system except where the butyl rubber is a non-halogenated butyl rubber. The role of the co-agent in peroxide cure systems is to enhance the cure-state and inhibiting chain-fragmentation or scission effect. Specific examples of useful organic peroxides are selected from octanoyl peroxide, lauroyl peroxide, benzoyl peroxide, tert-butyl peroctoate, p-chlorobenzoyl peroxide, 2,4-dicholorbenzoyl peroxide, cyclohexanone peroxide, tert-butyl peroxybenzoate, methyl ethyl ketone peroxide, dicumyl peroxide, di-tert-butyl peroxide, 2,5-dimethyl-2,5-di(benzoylperoxy)hexane, 2,5-dimethyl-2,5-di(tert-butylperoxy)hexane, di-tert-butyl diperoxyphthalate, tert-butylcumyl peroxide, diisopropylbenzene hydroperoxide, 1,3-bis(tert-butylperoxyisopropyl)benzene tert-butyl peroxy-pivalate, 3,5,5-trimethyl-hexanoyl peroxide, 1,1-bis (tert-butyl-peroxy)-3,5,5-trimethylcyclohexane, 1,1-bis (tert-butyl-peroxy)cyclohexane, etc.; azo compounds such as azobisisobutyronitrile, and the like.

The peroxide-based cure systems may be used with or without co-agents such as ethylene dimethacrylate, polyethylene glycol dimethacrylate, trimethylol propane trimethacrylate, divinyl benzene, diallyl itaconate, triallyl cyanurate, diallyl phthalate, allyl methacrylate, cyclohexyl methacrylate, m-phenylene bis maleimide (HVA-2), and the like.

Phenolic resin curatives are preferred for the preparation of the thermoplastic elastomer vulcanizate of the invention, and such cure systems are well known in the art and literature of vulcanization of rubbers. Their use in vulcanized compositions is more fully described in U.S. Pat. No. 4,311,628, the disclosure of which is fully incorporated herein by this reference.

A basic ingredient of such system is a phenolic curing resin made by condensation of halogen substituted phenol, $C_1$-$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840. Non-halogenated phenol curing resins are used in conjunction with halogen donors, preferably, along with a hydrogen halide scavenger. Ordinarily, halogenated, preferably brominated, phenolic resins containing about 2–10 wt.-% bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the crosslinking function of the phenolic resin, however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosure of which along with the disclosure of the aforesaid Giller and Gerstin patents are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

For halogenated butyl rubbers, a preferred cure system is one which is based on ZnO and/or MgO. In this system, the MgO does not act as an activator but as an acid acceptor to stabilize the rubber from dehydrohalogenation.

Another preferred cure system for halogenated butyl rubbers comprises ZnO and a maleimide product. Among the maleimide product, a bismaleimide is especially superior in effectiveness and m-phenylene bismaleimide (4,4'-m-phenylene bismaleimide) (HVA-2) preferred. Other examples of the bis-maleimide are 4,4'-vinylenediphenyl bismaleimide, p-phenylene bis-maleimide, 4,4'-sulfonyldiphenyl bismaleimide, 2,2'-dithiodiphenyl bismaleimide, 4,4'-ethylene-bis-oxophenyl bismaleimide, 3,3'-dichloro-4,4'-biphenyl bismaleimide, o-phenylene bismaleimide, hexamethylene bismaleimide and 3,6-purine bismaleimides. Usually about 1 to about 15 weight parts, preferably from about 2 to about 10 weight parts of the curative or curative system are used per 100 weight parts of the rubber (i) to be cured.

Modifier (B)

Generally, the polar modifier can be present in the high-frequency weldable composition of the invention in an amount between about 2 and about 50 wt.-%, based on the total amount of the thermoplastic rubber (A) and the polar modifier (B). In preferred embodiments, however, the amount of the polar modifier might have to be adjusted to more specific amounts, depending on the particular modifier employed. These embodiments are outlined hereinbelow.

Thermoplastic Polyurethane (a)

In a preferred embodiment of the present invention the thermoplastic rubber (A) is blended with at least about 25 wt.-%, typically about 25 to about 50 wt.-%, preferably about 30 to about 45 wt.-%, most preferably about 35 to about 40 wt.-% of a thermoplastic polyurethane (TPU), based on the total amount of (A) and (a). The resulting thermoplastic elastomeric compositions having superior HF-weldability in combination with good elastomeric properties. The welded materials show high peel-strength in the range of 20 to 60 N/cm and even rubber tear depending whether bond is measured across the entire weld or within the weld itself.

Thermoplastic polyurethane resins (a) according to the present invention are essentially linear polymers which can be thermally processed by techniques such as melt-extrusion, compression molding and injection molding and which are characterized by the presence of a repeating carbamate group —[—NHC(O)—]— in its backbone structure. Typically, thermoplastic polyurethane resins are prepared by reacting a polyol, preferably a polyol having a high molecular weight of at least 500 and being nominally a diol, with an organic polyisocyanate, preferably a diisocyanate, usually in the presence of a low molecular weight difunctional chain-extending agent. The diol employed can be a polyester diol, a polyether diol or combinations thereof. The type of high molecular weight diol selected can confer different characteristics and properties to the thermoplastic polyurethane (TPU) resin.

Generally speaking, a TPU resin prepared from a polyester diol will have a better toughness and oil/chemical resistance than one prepared from a polyether diol. Conversely, use of a polyether diol in preparing a TPU resin provides a product with better low temperature properties, resilience and resistance to hydrolytic degradation.

It is generally accepted that a TPU resin has a polymer morphology comprising "hard" and "soft" segments. Hard segments are molecular entities derived from reaction of the chain-extending agent with isocyanate. Soft segments are derived from the polyol/isocyanate reaction. The concentration of hard segments within the thermoplastic polyurethane is determined by the molar concentration of the chain-extending agent. For a given quantity of chain-extending agent, the molar concentration and hence hard segment concentration declines with increasing molecular weight of the agent.

Physical properties of the thermoplastic polyurethane resin can be controlled to an extent through the chain-extending agent. Increasing the quantity of a chain-extending agent such as, for example, 1,4-butane-diol, increases hardness and strength of the resulting resin, but can be detrimental to other physical properties, e.g. elongation. Combinations of chain-extending agents are frequently employed when it is necessary to enhance the flowability of such a resin, as described, for example, in U.S. Pat. No. 4,822,827, the disclosure of which is incorporated herein by reference. Combinations of different chain-extending reagents provide different hard segments within the resin. The flowability of such resins is enhanced because the ability of the hard segments to "crystallize out" on cooling is reduced.

The thermoplastic polyurethane resins prepared in accordance with the present invention are branched or linear polymers having a weight average molecular weight of at least about 30,000, preferably at least about 40,000), and more preferably at least about 45,000. In general, they have a glass transition temperature of about 10° C. to about 40° C. The thermoplastic polyurethane resins are characterized in that they contain few or no unreacted hydroxyl or isocyanate groups. Generally, the thermoplastic polyurethane resins can be further characterized in that they have a Shore Hardness of from at least about 50 A and up to about 85 D, and elongation percentage at break of up to 1000 percent. The thermoplastic polyurethane resins can be readily melt extruded, molded or injection molded to form goods and articles.

To provide a thermoplastic polyurethane resin by the process of this invention it is advantageous to employ the hereinabove described components in the following proportions.

For each mole of polyol having a molecular weight of from about 500 to about 5000 that is present, advantageously the chain-extending agent is present in an amount of from about 0.5 to about 15, preferably from about 1.0 to about 13, and more preferably from about 1.0 to about 10 moles. The exact mole quantity of chain-extending agent employed will be established experimentally and depends on the desired hardness for the resulting resin and the molecular weight of the polyol. Lower mole quantities of chain-extending agent are employed with lower molecular weight polyols to obtain a given hardness.

The organic diisocyanate is present in an amount sufficient to provide an overall reaction index of from about 0.8, preferably from about 0.9, more preferably from about 0.95, and most preferably from about 0.97, and up to about 1.2, preferably up to about 1.10, more preferably up to about 1.05, and most preferably up to about 1.03. For the purpose of this invention, the isocyanate reaction index is defined as the number of isocyanate groups per active hydrogen atom present in the reactive composition. An active hydrogen atom is one which is active in reacting with an isocyanate group as indicated by the Zerewitinoff test described by Kohler in *J. Am. Chem. Soc.*, Vol. 49, page 3181 (1927), which predicts the tendency of a hydrogen-containing group to react with an isocyanate. The organic diisocyanate is typically present in an amount of about 0.95 to 1.10, preferably about 1.0 to about 1.05, moles per mole of polyol.

The polyol employed in the process of this invention for manufacturing a thermoplastic polyurethane resin is essentially a linear hydroxyl-terminated material which has an average molecular weight of from about 500 to about 5,000. The polyol molecular weight is preferably from about 650 and more preferably from about 1,000, and preferably up to about 4,000 and more preferably up to about 3,000. It is further an advantage if the polyol or polyol composition employed in the process of this invention has a nominal or average functionality of form about 1.8 to about 2.25, preferably about 1.9 to about 2.2, and more preferably from about 1.95 to about 2.15. The term "average functionality" means the average number of active hydrogen atoms per molecule, such active hydrogen atoms being associated with, in the case of polyols, the hydroxyl group.

The polyol employed in the process of the invention can be a polyether polyol, a polyester polyol or mixtures thereof. When a polyether polyol is employed, advantageously it will have a molecular weight of from about 500 to about 3,000. When a polyester polyol is employed, advantageously it will have a molecular weight of from about 650 to about 4,000.

Small quantities of compounds having a molecular weight of about 500 or more and containing less than an average of about 1.8 active hydrogen atoms per molecule, or more than about 2.5 active hydrogen atoms per molecule, may also be employed in combination with the polyol provided the average functionality is as discussed above. Use of such additional compounds may be desirable in particular circumstances for enhancement of physical properties of the resin. The polyether polyols contemplated for use in this present invention can readily be prepared by polymerizing a cyclic ether such as, for example, tetrahydrofuran, or by reacting one or more alkylene oxides with an initiator containing an average of 2 active hydrogen atoms per molecule. Use of catalysts such as boron trifluoride potassium hydroxide, triethylamine, tributyl amine and the like is generally advantageous. Typically, the alkylene oxide will be ethylene oxide, propylene oxide, 1,2- or 2,3-butylene oxide and/or epichlorohydrin. Exemplary of suitable initiators are water, glycols such as ethylene glycol, propylene glycol, butylene glycol, hexylene glycol or dialkylene glycols. Suitable polyether polyols for use in this present invention include, for example, those containing at least about 50 wt.-% oxyethylene (—O—CH$_2$—CH$_2$—) units, or a polyoxyethylene/polyoxypropylene block copolymeric glycol, or a mixture of more than one of such polyols.

The polyester polyols contemplated for use in the present invention are any of the conventional polyester diols known to those skilled in the art and include poly(alkylene alkanedioate)diols and poly(oxycaproyl)diols. The poly (alkylene alkanedioate)diols can suitably be prepared via well-known esterification techniques using a predetermined molar excess of an aliphatic glycol with relation to a dicarboxylic acid such as described in, for example, U.S. Pat. No. 2,423,823, the disclosure of which is incorporated herein by reference. Adipic acid is the preferred dicarboxylic acid although succinic, glutaric, sebacic, malonic, maleic, fumaric or terephthalic acids may be used as well. Illustrative of the aliphatic glycols which can be employed for the preparation of poly(alkylene alkanedioate)diols are ethylene glycol, 1,3-propylene glycol, 1,4-butanediol, 1,3-butylene glycol, neopentyl glycol, 1,6-hexanediol, 1,2-dimethyl-1,2-cyclohexanediol and 1,12-dodecanediol. Minor amounts of a polyfunctional alcohol such as 1,2,6-hexanetriol or pentaerythritol may also be used if desired.

The poly(oxycaproyl)diols contemplated for use in the present invention are well-known in the art and described in, for example, U.S. Pat. Nos. 3,169,945, 3,248,417, and 3,021,309 through 3,021,317, inclusive, the disclosure of each of which is incorporated herein by reference. A general procedure involves reacting a molar excess of epsilon-caprolactone with an initiator which contains two active hydrogen-containing groups being capable of opening the lactone ring whereby it adds as an open chain to the site of the active hydrogen-containing group.

The chain-extending agent contemplated for use in the TPU of this invention is an active hydrogen compound having at least two functional groups having active hydrogen atoms suitable for reaction with available isocyanate groups and having an equivalent weight advantageously less than about 200, more preferably less than about 100, and a molecular weight of 400 or less, preferably from 60 to 400, more preferably from 60 to 300, and most preferably from 60 to 250. Chain extenders are preferably difunctional, that is, they have exactly two functional groups containing active hydrogen atoms per molecule. However, mixtures of difunctional and trifunctional compounds may also be useful. Suitable chain extenders include primary and secondary diamines, amino alcohols, amino acids, hydroxy acids, diols, glycols or mixtures thereof. Exemplary compounds include ethylene diamine, hydroxy amines such as ethanolamine, propanol amine, diethanol amine and the like. A chain extender is generally chosen to achieve preselected physical properties such as hardness, toughness, and the like, in a molded object.

Advantageous chain extenders include primary and secondary diamines which react readily with isocyanates. Such chain extenders include phenylene diamine, bis(3-chloro-4-aminophenyl)methane, 2,4-diamino-3,5-diethyl toluene, 2,6-diamine-3,5-diethyl toluene, trisecondary butanolamine, isopropanolamine, diisopropanolamine, N-(2-hydroxypropyl)ethylenediamine, N,N'-di(2-hydroxypropyl) ethylenediamine, dialkyl diaminobenzenes such as those disclosed in U.S. Pat. No. 4,526,905, the disclosure of which is incorporated herein by reference and the like.

Dihydroxyl chain-extending agents may comprise aliphatic, cycloaliphatic or aromatic dihydroxyl compounds, or diols, having from 2 to 10 carbon atoms. Illustrative of such diols are ethylene glycol, 1,3-propanediol, 1,5-pentanediol, 1,6-hexanediol, 1,2-propanediol, 1,3-butanediol, 1,4-butanediol, 2,3-butanediol, 1,3-pentanediol, 1,6-hexanediol, 3-methylpentane-1,5-diol, 1,4-cyclohexanediol, and mixtures of two or more such diols. Compounds such as ethoxylated hydroquinone can also be employed as a chain-extending agent. The above-mentioned chain-extending agents can be used alone or in admixture with each other or with other compounds including diethylene glycol, dipropylene glycol, tripropylene glycol, 3methyl-1,5-pentane diol, ethanolamine, N-methyl diethanolamine, N-ethyl diethanolamine as well as ester diols obtained by esterifying adipic, azelaic, glutaric and the aliphatic dicarboxylic acids with aliphatic diols such as those exemplified above utilizing from 0.01 to 0.8 mole of acid per mole of diol. Also included as chain extending agents which can be used in the process are adducts obtained from an aliphatic diol or triol such as, for example, 1,4-cyclohexane dimethanol, neopentyl glycol, hexane-1,2-diol, ethylene glycol, butane-1,4-diol and trimethylolpropane with caprolactone in a mole ratio of from 0.01 to 2 moles of caprolactone per mole of diol or triol.

While any of the chain-extending agents exemplified above can be employed in the process of the invention, it is preferred to use 1,6-hexanediol, neopentyl glycol, 1,4-cyclohexane diol, ethylene glycol, bis(hydroxyethoxy) benzene, ethoxylated hydroquinone, diethylene glycol and, especially, 1,4-butanediol.

It is also possible to employ the chain-extending agent in combination with small amounts of compounds which are monofunctional or trifunctional compounds. Typically, the amount is not more than 0.2 and preferably not more than 0.1 mole per mole of polyol. Exemplary of monofunctional compounds are alcohols or chain-stopping agents, and of trifunctional compounds are glycerine or trimethylolpropane. Those additional compounds may be employed when it is desired to modify physical properties or processing characteristics of the thermoplastic polyurethane resin.

Any of the organic diisocyanates employed in the preparation of polyurethanes can be employed in preparing the TPUs by the process of this present invention. Such isocyanates may be aliphatic, aromatic or alicyclic isocyanates. Illustrative of such aromatic isocyanates are diphenylmethane diisocyanates including the 4,4'-isomer, the 2,4'-isomer and mixtures thereof, meta- and para-phenylene diisocyanates, chlorophenylene diisocyanates, alpha,alpha-xylylene diisocyanate, 2,4- and 2,6-toluene diisocyanate and mixtures of these latter two which are available commercially, 1,5-naphthalene diisocyanate, toluidine diisocyanate. Illustrative of such aliphatic isocyanates are hexamethylene diisocyanate, isophorone diisocyanate and methylene bis(cyclohexylisocyanate) including the 4,4'-isomer and 2,4'-isomer.

Advantageously, the organic diisocyanate employed in the process of this invention is an aromatic diisocyanate preferably comprising diphenylmethane diisocyanate. Advantageously, the organic diisocyanate consists essentially of diphenylmethane diisocyanate wherein the isomer 4,4'-diphenylmethane diisocyanate is present in an amount of from 50 to 100, preferably from 75 to 100, and more preferably from 90 to 100 wt.-% and the remainder will generally be the 2,4'-diphenylmethane diisocyanate isomer and modified forms of these diisocyanates.

The modified forms of diisocyanates are those forms of methylene bis(phenylisocyanate) which have been treated to render them stable liquids at ambient temperature. Such products include those which have been reacted with a minor amount (up to 0.2 equivalents per equivalent of a polyphenyl polyisocyanate) of an aliphatic glycol or mixture of aliphatic glycols; such modified methylene bis (phenylisocyanates) are described in U.S. Pat. Nos. 3,394, 164, 3,883,571, 4,115,429, 4,118,411 and 4,299,347, the disclosure of each of which is incorporated herein by reference; and those wherein a minor amount of the diisocyanate has been converted to the corresponding carbodiimide as described in, for example, U.S. Pat. No. 3,384,653, the disclosure of which is incorporated herein by reference. Mixtures of the above-described polyisocyanates can be employed if desired.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisocyanates obtained by phosgenation of a mixture of toluene diamines or crude diphenylmethylene diisocyanate obtained by phosgenation of crude diphenylmethylenediamine. Crude isocyanates are disclosed in U.S. Pat. No. 3,215,652, which is incorporated herein by reference.

The thermoplastic polyurethane resins of the present invention can be prepared according to several different known methods. In the so-called "one-shot" method, the polyol, organic diisocyanate, dihydroxy chain-extending agent, and other additives, if any, are simultaneously mixed and reacted at an elevated temperature. Another method involves the so-called "prepolymer" method in which a part or all of the polyol is first reacted with the diisocyanate to give an isocyanate-terminated prepolymer which subsequently is contacted and reacted with any remaining part of the polyol and the chain-extending agent. Variations of the above methods can also be used such as first reacting the chain-extending agent with the diisocyanate and then reacting the intermediate product with the polyol.

The thermoplastic polyurethane resins of this present invention are preferably prepared by a "one-shot", "bulk" preparation process in the absence of processing solvents such as dimethylformamide. In such a process the reactants are combined at a temperature of typically from about 160° C. to 260° C. The resulting mixture is introduced into a suitable heated surface, preferably with degassing under reduced pressure, and is maintained at a temperature of from about 40° C. to 190° C., preferably about 90° C. to 120° C., until its viscosity increases and it starts to solidify. Generally, the point of solidification can be attained in a period of from a few seconds to a few minutes, depending on the system reactivity. At this stage, the "solidified" reaction mass is a material which can be cooled, diced and stored or alternatively extruded into desired particle shapes or sizes. When an extruder is used as reactor, the obtained polymer can be extruded directly to give strings or films, or be handled directly by an underwater dicer.

It is often desirable, but not essential, to include a catalyst in the preparation of thermoplastic polyurethanes of the present invention. Any of the catalysts conventionally used in the art to catalyze or accelerate the reaction of an isocyanate with a reactive hydrogen-containing compound can be used for this purpose; see for example, Saunders et al, *Polyurethanes, Chemistry and Technology, Part I, Interscience,* pp. 228–232, New York (1963), and Britain et al, *J. Applied Polymer Science,* 4, 207–211 (1960), which pages are incorporated herein by reference. Such catalysts include organic and inorganic acid salts and organometallic derivatives of bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Illustrative of such catalysts are stannous octoate, stannous oleate, dibutyltin dioctoate, dibutyltin dilaurate, cobalt naphthenate, tetramethyltin, triethylamine, triethylenediamine, N,N,N',N'-tetramethylenediamine, N,N,N',N'-tetraethylenediamine, N-methylmorpholine, N-ethylmorpholine, N,N,N',N'-tetramethylguanidine or N,N'-diethylethanolamine. The amount of the catalyst employed is that amount which will effectively catalyze the reaction of hydroxyl-containing compounds with the aromatic diisocyanate. The specific amount will depend on the particular reactants and catalyst being employed. Generally, the amount of the catalyst used is within the range of from 0.0001 to 0.1 percent by weight based on the total amount of the reactants.

Exemplary thermoplastic PU which can be used in conjunction with the present invention are available from Noveon, Cleveland, Ohio, United States under the trade designation Estane® 5703, from BASF under the trade designation Elastollan® C78A 10, Pellethane® 2103/80PF from Dow and from Taiwan URE-Tech under the tradenames Utechllans U-85A, U-95, U-95A.

In case that thermoplastic elastomers are combined with a polyurethane modifier a compatibilizer which prevent the delamination of both materials can be used. A suitable compatibilizer for instance is Fusabond® MD353D, a PP random Copolymer; supplied by DuPont Dow. Due to the sensitivity of the thermoplastic polyurethane resins to humidity, a modification of the thermoplastic elastomeric rubbers by different modifiers could be desirable, in particular, if the elastomer compositions are exposed to humid environment, for instance, for roofing or under the hood applications.

Chlorinated Polyolefin (b)

In an alternative embodiment a chlorinated polyolefin (PO) (b) can be used as a modifier (B) to render the olefinic thermoplastic elastomers HF-weldable. To achieve good HF-weldability at least about 5 to about 20 wt.-%, preferably about 8 to about 15 wt.-%, most preferably about 10 wt.-% of the chlorinated polyolefin (b)—based on the total amount of (A) and (b)—has to be used in the composition according to the present invention.

The chlorinated polyolefin (b) can partially be used as an substitute for the more expensive and humidity sensitive thermoplastic PU-resin modifier (a). A HF-weldable thermoplastic elastomeric composition according to the present invention comprises at least about 1.0 to about 10.0 wt.-%, preferably at least about 2.0 to about 4.0 wt.-%, more preferably at least 2.5 to about 3.0 wt-%, of the chlorinated polyolefin (b) and at least about 20 to about 40 wt.-%, preferably about 25 to about 35 wt.-% most preferably about 33 wt.-% of a thermoplastic polyurethane (TPU), based on the total amount of the rubber (A), the PU (a) and the chlorinated PO (b).

Suitable chlorinated polyolefins (b) are chlorination products of polyolefins, preferably polyethylene, polypropylene and copolymers of ethylene and propylene, more preferably chlorinated high density polyethylene.

The chlorine content of the chlorinated polyolefins to be used is expediently in the range from 20 to 45, preferably from 25 to 40%, by weight. They have a mean molecular weight preferably in the range of from 30,000 to 300,000, more preferably from 40,000 to 100,000, calculated from the chlorine content and the molecular weight of the starting polyethylene determined by gel chromatography (cf., WeBlau, *Makromolekulare Chemie*, volume 26, pages 96 to 101, (1958)).

Exemplary chlorinated polyolefins (b) which can be used in conjunction with the present invention are available from Noveon under the trade designation Estane® 5703, from BASF under the trade designation Elastollan® C78A10 and from Taiwan URE-Tech under the tradenames Utechllan® U-85A, U-95, U-95A.

Copolymers of Mono-Olefins and Vinyl Acetate (c)

In a further alternative embodiment a copolymer of mono-olefins and vinylacetate (c) can be used as a modifier (B) to render the olefinic thermoplastic elastomers HF-weldable. To achieve good HF-weldability at least about 5 to about 20 wt.-%, preferably about 8 to about 15 wt.-%, most preferably about 12 wt.-% of the copolymer (c), based on its effective vinyl acetate content to the total amount of (A) and (c) has to be used in the composition according to the present invention.

Suitable copolymers of mono-olefins and vinylacetate (c) are random or block copolymers of $C_2$ to $C_{12}$, preferably $C_2$ to $C_{10}$, most preferably $C_2$ to $C_8$ mono-olefins and vinyl acetate. Said vinyl acetate containing copolymers comprising from about 10 to about 40, preferably from about 15 to about 35, most preferably from about 20 to about 30 wt.-% of vinyl acetate, based on the total amount of the copolymer. Preferred mono-olefins are selected from the group consisting of ethylene, propylene, 1-butene, 1-hexene, 1-octene and 4-methyl-1-pentene. Ethylene is the preferred mono-olefin. Preferably, ethylene vinyl acetate (EVA) is used as one alternative thermoplastic resin (B). Typically, the ethylene vinyl acetate comprises from about 10 to about 40, preferably from about 15 to about 35, most preferably from about 20 to about 30 wt.-% vinyl acetate, based upon the total amount of the ethylene vinyl acetate.

Exemplary EVA are available from Bayer under the trade designations Levapren® 452 and 600HV and from Exxon-Mobil under the trade designations Escorene® UL 00730, Ultra UL00014 and FL00012.

Terpolymers of Styrene, Butadiene and Acrylonitrile (d)

In a further alternative embodiment of the present invention terpolymers of of styrene, butadiene and acrylonitrile (d) (ABS) can be used as a modifier (B) to render the olefinic thermoplastic elastomers HF-weldable. To achieve good HF-weldability at least 15 to 40 wt.-%, preferably 18 to 30 wt.-%, most preferably 20 wt.-% of the terpolymer (d), based on the total amount of (A) and (d) has to be used in the composition according to the present invention.

Suitable terpolymers of styrene, butadiene and acrylonitrile monomer comprise from about 30 to about 60 wt.-% of styrene, from about 25 to about 50 wt.-% of butadiene, from about 10 to about 30 wt.-% of acrylonitrile, based on the total amount of styrene, butadiene and acrylonitrile in the terpolymer.

An exemplary ABS is available from Eliokem under the trade designation Sunigum® G7752, which is a crosslinked butyl acrylate rubber with a low level of bound carboxylic acid groups. 50 wt.-% styrene and 50 wt.-% of acrylonitrile are overpolymerized onto the crosslinked acrylate rubber to give 25 wt.-% of the plastic phase.

The preparation of said thermoplastic terpolymers mentioned above is conventional in the art and known to the skilled person.

Blends of any of the above polar modifiers (B) can be employed as far as compatibility can be achieved, rather than a single polar modifier (B).

It has to be noted that thermoplastic rubber (A) can first be prepared as such (e.g. in a twin screw extruder) and then mixed, for instance, dry-blended with the polar modifier (B) prior to the final blending.

Alternatively, the uncured rubber (i), the thermoplastic polyolefin homopolymer or copolymer (ii) and the optional conventional additives and fillers (iii) can be melt mixed with the polar modifier (B) in one step. This melt-mixing can be made either on down-stream during manufacturing of the thermoplastic elastomer or in a second pass in a Banbury, single- or double-screw extruder. The processing is performed under conditions of high shear.

As far as the processing of the above-described compositions and the manufacture of the specific weldable modified thermoplastic elastomers is concerned, it is referred to publication WO-A-95/26380, the contents of which is fully incorporated herein by reference.

High-Frequency Welding

The technology of high-frequency welding of polymers is well known in the art. For additional information it is referred to the methods already known from the prior art, for instance, "Hochfrequenzschweissen in der Kunststofftechnik", authors U. W. Rische et al, Herfurth GmbH (editor), Hamburg, Germany, 1986 and the references cited therein.

Typically, the parts to be welded are pressed together at the respective surfaces and exposed to a high-frequency (generally 27.12 MHz) at a HF-power of 1 to 20 kW, preferably about 5 kW for a welding time of between 1 and 60 seconds, depending on the parts to be welded, followed by cooling. The method according to the present invention can advantageously be used to weld films (thickness less than 300 µm), sheets (thickness 300 µm to 2 mm), boards (thickness above 2 mm), extruded profiles or hoses, injection- or blow-molded parts, or surfaces of articles of any other shape permanently together.

The following examples are presented to illustrate the invention which is not intended to be considered as being limited thereto. In the examples and throughout the description percentages are by weight unless otherwise indicated.

While in accordance with the patent statutes, the best mode and preferred embodiment have been set forth, the scope of the invention is not limited thereto, but rather by the scope of the attached claims.

EXAMPLES

Starting Materials

TPE

All Santoprene and Vistaflex types are available are available from Advanced Elastomer Systems, Akron, US.

The Shore A hardness has been determined in accordance with ASTM D2240-02 @ 5 seconds delay; the density has been determined in accordance with ASTM D792-00.

| | |
|---|---|
| Santoprene ® 8211-55 | high flow molding TPE; Shore A 53; density 1.04 g/cm$^3$ |
| Santoprene ® 8211-65 | high flow molding TPE; Shore A 65; density 0.92 g/cm$^3$ |
| Santoprene ® 8211-75 | high flow molding TPE; Shore A 75; density 0.92 g/cm$^3$ |
| Santoprene ® 8201-80 | general purpose TPE; Shore A 80; density 0.95 g/cm$^3$ |
| Santoprene ® 201-64 | general purpose TPE; Shore A 64; density 0.97 g/cm$^3$ |
| Santoprene ® 8291-60 TB | textile bondable TPE comprising 7 wt.-% Fusabond ® MD353D, Shore A 60; density 0.95 g/cm$^3$ |
| Santoprene ® 8291-65 TB | textile bondable TPE comprising 7 wt.-% Fusabond ® MD353D; Shore A 65; density 0.95 g/cm$^3$ |
| Santoprene ® 8291-80 TB | textile bondable TPE comprising 7 wt.-% Fusabond ® MD353D; Shore A 80; density 0.95 g/cm$^3$ |
| Santoprene ® 8291-75 PA | polyamide blended TPE; Shore A 75; density 0.93 g/cm$^3$ |
| Santoprene ® 8291-85 PA | polyamide blended TPE; Shore A 85; density 0.94 g/cm$^3$ |
| Santoprene ® 8201-80 HT | High tensile properties coupled with high abrasion resistance; density 0.95 g/cm$^3$. |
| TPO | |
| Vistaflex ® 671N | blend of non-crosslinked EPDM and EVA, Shore A 61; density 0.910 g/cm$^3$ |
| Vistaflex ® 714N | Blend of non-crosslinked EPDM and PP; Shore A 75; density 1.00 g/cm$^3$ |
| Vistaflex ® VM42E | rubber-rich blend of non-crosslinked EPDM and HDPE; density 0.96 g/cm$^3$ |
| Chlorinated Polyolefins | |
| Tyrin ® BH9000 | chlorinated polyethylene supplied by DuPont Dow |
| Trapylen ® 186 S | chlorinated PP supplied by Tramaco |
| Trapylen ® 803 | chlorinated PP supplied by Tramaco |
| Trapylen ® 196S | chlorinated PP, chlorine content 26 ± 1%, supplied by Tramaco |
| TPU | |
| Estane ® 5703 | polyester based TPU; Shore A 70; density 1.19 g/cm$^3$; supplied by Noveon |
| Elastollan ® C78A10 | polyester based TPU; Shore A 80 (DIN 53505); density 1, 18 g/cm$^3$ (DIN 53479); supplied by BASF Elastogran |
| Utechllan ® U-85A | TPU supplied by Taiwan URE-Tech |
| Utechllan ® U-95 | TPU supplied by Taiwan URE-Tech |
| Utechllan ® U-95A | TPU supplied by Taiwan URE-Tech |
| EVA Copolymers | |
| Levapren ® 452 | VA content 45 ± 1.5 wt.-%; melt index (190° C./21.2 N) 5–15 g/10 min; density 0.99 g/cm$^3$; supplied by Bayer |
| Levapren ® 600HV | VA content 60 ± 1.5 wt.-%; density 1.04 g/cm$^3$; supplied by Bayer |
| Escorene ® UL 00730 | VA content 29.5 wt.-%; melt index 7 g/10 min (ASTM D1238-01); density 0.95 g/cm$^3$ (ASTM D1928/1505); supplied by ExxonMobil |
| Escorene ® Ultra UL00014 | VA content 14 wt.-%, melt index 0.25 g/10 min (ASTM D1238-01; density 0.94 g/cm$^3$ (ASTM D1928/1505); supplied by ExxonMobil |
| Escorene ® FL00012 | VA content 12 wt.-%, melt index 0.30 g/10 min (ASTM D1238-01), supplied by ExxonMobil |
| ABS Terpolymers | |
| Sunigum ® G7752 Rubber | supplied by Eliokem, is a core/shell-polymer comprising 75 wt.-% of cross-linked butyl acrylate rubber having carboxylic acid groups present on the particle surface (core) and 25 wt.-% of a styrene acrylonitrile copolymer (monomeric ratio 1:1) (shell), to which 7% of CaCO$_3$ have been added as a partitioning agent. |

-continued

| Additives | |
|---|---|
| Epicote ® 828EL-B-90 | epoxy resin based on bisphenol A; supplied by Resolution Performance Products |
| Fusabond ® MD353D | maleic acid anhydride modified random Copolymer of polypropylene; supplied by DuPont Dow |

High-frequency welding conditions

| | |
|---|---|
| Machine: | Schwalbach High-frequency welder |
| Frequency: | 27.12 MHz |
| Power: | 5 kW |
| Welding time: | 7 sec |
| Cooling time: | 10 sec |
| Electrode: | 40 × 2 cm |
| Pressure: | 40 bar |

Different samples of melt blends were extruded into strips and then high-frequency welded under standard commercial conditions. The peel-strength of the welds was then measured using a crosshead speed of 100 mm per minute.

All examples shown in the following tables which do not fall under the claimed invention have been put in parenthesis.

| | |
|---|---|
| Determination of tear resistance: | ISO 34-1, Method B |
| Determination of weld strength: | DIN 53357 @100 mm/min |
| Determination of tensile strength: | ISO 37 |
| Elongation at break: | ISO 37 |
| Modulus: | ISO 37 |

TABLE 1

| | Example | | |
|---|---|---|---|
| | 1 | 2 | 3 |
| Santoprene ® 8291-80 TB [wt.-%] | 50 | 60 | 70 |
| Estane ® 5703 [wt.-%] | 50 | 40 | 30 |
| Total weld strength (Peel) [N/cm] | 57 | rubber tear | 30 |
| Within weld [N/cm] | 19 | 14 | 19 |

Santoprene® 8291-80 TB is high-frequency weldable with 30% or more Estane® 5703. The value of the bond strength is dependent on whether the entire weld including the bead is measured or only that area which falls between the two beads.

Following Table 2 Examples 1–3 have been repeated using the softer grade Santoprene® 8291-60 TB, viz., 8291-60 TB and reducing the amount of PU (Estane® 5703).

TABLE 2

| | Example | | | |
|---|---|---|---|---|
| | 4 | 5 | 6 | 7 |
| Santoprene ® 8291-60 TB [wt.-%] | 50 | 70 | 85 | 95 |
| Estane ® 5703 [wt.-%] | 50 | 30 | 15 | 5 |
| Total weld strength (Peel) [N/cm] | 56 | 6 | 0 | 0 |
| Within weld [N/cm] | 16 | 5 | 0 | 0 |

The result clearly shows that welding is also possible with the softer Santoprene® 8291-60 TB grade. The optimum weldability appears to be obtained if more than 30 % of Estane® 5703 are employed. In the above tables no account was taken on the sample thickness.

The following two tables (table 3 and 4) demonstrate the influence of alternative PU's, the ester and ether types.

TABLE 3

| | Example | | | |
|---|---|---|---|---|
| | 8 | 9 | 10 | 11 |
| Santoprene ® 8291-60TB [wt.-%] | 50 | | | |
| Santoprene ® 8291-65TB [wt.-%] | | 50 | 50 | 50 |
| Utechllan ® U-85A ester [wt.-%] | | 50 | | |
| Utechllan ® UE-85 ether [wt.-%] | | | 50 | |
| Utechllan ® UE-95A ether [wt.-%] | | | | 50 |
| Estane ® 5703 ester [wt.-%] | 50 | | | |
| Weld strength within weld [N/cm] | 4 | 3.5 | 2.3 | — |

Sample thickness +/− 0.3 mm

A high-frequency weld can be obtained with both ether and ester types.

TABLE 4

| | Example | | | |
|---|---|---|---|---|
| | 12 | 13 | 14 | 15 |
| Santoprene ® 8201-60 [wt.-%] | 59.5 | 59.5 | 59.5 | 59.5 |
| Estane ® 5703 ester [wt.-%] | 35.0 | 35.0 | — | — |
| Elastollan ® C78A10 | — | — | 35 | 35 |
| Trapylen ® 803 | 5 | 5 | 5 | 5 |
| Epicote ® 828EL-B-90 | 0.5 | 0.5 | 0.5 | 0.5 |
| Mixing conditions (Twin screw) | | | | |
| Screw speed RPM | 150 | 250 | 150 | 250 |
| Torque | 150–170 | 155–165 | 180–205 | 170–195 |
| Melt temp [° C.] | 195 | 194 | 195 | 196 |
| Weld strength within weld [N/cm] | 14 | 14 | 10 | 14 |

The effect of replacement of the textile bondable Santoprene® grade by a regular Santoprene® 8201-60 grade which has been melt-mixed with Estane® 5703 and Fusabond® MD353 D is given in Table 5.

TABLE 5

|  | Example | | | |
|---|---|---|---|---|
|  | 16 | 17 | 18 | 19 |
| Santoprene ® 8201-60 [wt.-%] | 43 | 35 | 53 | 45 |
| Estane ® 5703 [wt.-%] | 50 | 50 | 40 | 40 |
| Fusabond ® MD353D [wt.-%] | 7 | 15 | 7 | 15 |
| Weld strength within weld [N/cm] | RT | RT | RT | RT |

RT = rubber tear

From the above it appears that high frequency welds with rubber tear can be obtained by the straight addition PU and Fusabond® to the regular grade Santoprene®.

TABLE 6

|  | Example | | | | |
|---|---|---|---|---|---|
|  | 20 | 21 | 22 | (23) | 24 |
| Santoprene ® 8201-60 [wt.-%] | 55 | 54 | 59.5 | 62.3 | 55 |
| Estane ® 5703 [wt.-%] | 35 | 35 | 35 | 35 | 35 |
| Trapylen ® 803 [wt.-%] | 10 | 10 | 5 | 2.5 | — |
| Epicote ® 828EL-B-90 [wt.-%] | — | 1 | 0.5 | 0.2 | — |
| Tyrin ® BH9000 |  |  |  |  | 10 |
| Physical properties (measured on extruded strips) |  |  |  |  |  |
| Hardness shore A | 66 | 60 | 59 | 55 | 56 |
| Tensile Strength [MPa] | 13.3 | 11.2 | 10.7 | 8.8 | 8.7 |
| Elongation @ break % | 716 | 730 | 684 | — | 675 |
| 100% Modulus [MPa] | 2.4 | 2.4 | 2.2 | 2.1 | 1.9 |
| Tear [kN/m] | 34 | 31 | 29 | 27 | 25 |
| Weld strength within weld [N/cm] | 20 | 14 | 20 | 5 | 11 |

Table 6 demonstrates the effect on the bond level, if the level of TPU is kept on it's supposed lowest level and the Fusabond® is replaced by a chlorinated polypropylene (Trapylen® 803) and/or a chlorinated polyethylene (Tyrin® BH9000).

The results indicate that if the amount of chlorinated polypropylene is reduced below 2.5% there is a significant drop off in weldability. Similar behavior was observed when using chlorinated polyethylene.

Table 7 shows that Santoprene® can be rendered high-frequency weldable by the incorporation of chlorinated polypropylene.

TABLE 7

|  | Example | | |
|---|---|---|---|
|  | 25 | 26 | 27 |
| Santoprene ® 8201-60 [wt.-%] | 78 | 83.5 | 89 |
| Trapylen ® 802 [wt.-%] | 20 | 15 | 10 |
| Epicote ® 828 [wt.-%] | 2 | 1.5 | 1 |
| Weld strength within weld [N/cm] | 20 | 20 | 16 |

In order to obtain hf-weldability by use of chlorinated polypropylene instead of the PU/Fusabond combination, a minimum of 10% has to be used.

TABLE 8

|  | Example | | | | |
|---|---|---|---|---|---|
|  | 28 | 29 | 30 | 31 | 32 |
| Santoprene ® 8201-60 [wt.-%] | 78 |  |  |  |  |
| Vistaflex ® 714 N |  | 78 |  |  |  |
| Vistaflex ® VM42 E |  |  | 78 |  |  |
| Vistaflex ® 671N |  |  |  | 50 | 60 |
| rigid PVC [wt.-%] |  |  |  | 50 | 40 |
| Trapylen ® 196S [wt.-%] | 20 | 20 | 20 |  |  |
| Epicote ® 828EL-B-90 [wt.-%] | 2 | 2 | 2 |  |  |
| Weld strength within weld [N/cm] | 20 | 24 (RT) | na | RT | RT |

The addition of chlorinated polypropylene to a TPO and a rubber concentrate such as Vistaflex® 714 N and VM 42 E results in a material that can be high-frequency welded. Furthermore Vistaflex® 671N in combination with rigid PVC will also weld by high-frequency.

TABLE 9

|  | Example | | |
|---|---|---|---|
|  | 33 | 34 | 35 |
| Santoprene ® 8201-60 [wt.-%] | 78 |  |  |
| Santoprene ® 8201-70 [wt.-%] |  | 78 |  |
| Santoprene ® 8201-80 [wt.-%] |  |  | 78 |
| Trapylen ® 803 [wt.-%] | 20 | 20 | 20 |
| Epicote ® 828EL-B-90 [wt.-%] | 2 | 2 | 2 |
| Hardness shore A | 70 | 74 | 76 |
| Thickness [mm] | 0.55 | 0.55 | 0.65 |
| Weld strength within weld [N/cm] | 18 | 20 | 23 |

The influence of hardness and polypropylene content on weld strength is given in Table 9. An upward trend in weld strength with increase of polypropylene content is evident from Examples 33 to 35.

TABLE 10

|  | Example | | | | | |
|---|---|---|---|---|---|---|
|  | (36) | 37 | 38 | 39 | 40 | 41 |
| Santoprene ® 8201-60 [wt.-%] | 80 | 80 | 80 | 80 |  |  |
| Santoprene ® 8201-80 [wt.-%] |  |  |  |  | 60 | 50 |
| UL 00014 [wt.-%] | 20 |  |  |  |  |  |
| UL 00730 [wt.-%] |  | 20 |  |  |  |  |
| Levapren ® 452 [wt.-%] |  |  | 20 |  |  |  |
| Levapren ® 600HV [wt.-%] |  |  |  | 20 |  |  |
| Escorene ® 000730 [wt.-%] |  |  |  |  | 40 | 50 |
| Vinyl Acetate content [wt.-%] | 14 | 29.5 | 45 | 60 |  |  |
| Effective Vinyl Acetate content [wt.-%] |  |  |  |  | 11.6 | 14.5 |
| Hardness shore A | 65 | 62 | — | 53 |  |  |
| Thickness [mm] | 0.6 | 0.55 | 0.55 | 0.6 | 0.7 | 0.75 |
| Weld strength within weld [N/cm] | 0 | 3 | 5 | 1 | 20 | 28 |

Table 10 shows the influence of 20% of EVA, having vinyl acetate contents ranging from 14–60%, on a soft grade of Santoprene®.

TABLE 11

|  | Example | | |
| --- | --- | --- | --- |
|  | 42 | 43 | 44 |
| Santoprene ® 8291-60 TB [wt.-%] | 78 | 83.5 | 89 |
| Trapylen ® 803 [wt.-%] | 20 | 15 | 10 |
| Epicote ® 828 EL B [wt.-%] | 2 | 1.5 | 1 |
| Hardness Shore A | 65 | — | 73 |
| Thickness [mm] | 0.65 | 0.65 | 0.65 |
| Weld strength within weld [N/cm] | 30 | 32 | 25 |

Table 11 demonstrates the effect of varying amounts of chlorinated polypropylene on high-frequency welding behavior of a textile bondable Santoprene® grade.

TABLE 12

|  | Example | | |
| --- | --- | --- | --- |
|  | 45 | 46 | 47 |
| Santoprene ® 201-64 [wt.-%] | 90 | 80 | — |
| Santoprene ® 8201-80 HT [wt.-%] | — | — | 70 |
| Sunigum ® Rubber [wt.-%] | 10 | 20 | 30 |
| Thickness [mm] | 1.0 | 1.0 | 1.0 |
| Weld strength within weld [N/cm] | 0 | 22 | 40 |

Table 12 demonstrates the influence of an acrylate terploymer on the HF-weldability of Santoprene®.

What is claimed is:

1. A modified thermoplastic rubber composition comprising
    (A) a thermoplastic elastomer vulcanizable comprising
        (i) a vulcanized rubber; and
        (ii) a thermoplastic polyolefin homopolymer or copolymer; and
    (B) a polar modifier in an amount effective to render said thermoplastic rubber composition high-frequency weldable, wherein the polar modifier is comprising a mixture of at least about 2.5 to about 10 wt.-% of the chlorinated polyolefin resin (b) and at least about 35 to about 50 wt.-% of the thermoplastic polyurethane resin (a), based on the total amount of (A), (a) and (b).

2. The composition of claim 1 wherein the rubber (i) is selected from the group consisting of ethylene/alpha-olefin/non-conjugated diene copolymer rubbers, copolymer rubbers of monomers comprising ethylene and at least one other alpha-olefin of the formula $CH_2=CHR$ wherein R is a straight or branched alkyl residue of 1 to 12 carbon atoms, butyl rubber, halogenated butyl rubber, copolymers of $C_4$ to $C_{12}$ isomonoolefins and para-alkylstyrene or their halogenated derivatives, natural or synthetic rubbers, polyisoprene rubber, polybutadiene rubber, styrene/butadiene copolymer rubbers and blends thereof.

3. The composition of claim 1 wherein the thermoplastic rubber (A) comprises about 10 wt.-% to about 95 wt.-% of said rubber (i) and about 90 wt.-%/0 to about 5 wt.-% of the thermoplastic polyolefin homopolymer or copolymer (ii), based on the total amount of (i) and (ii).

4. The composition of claim 1 wherein the thermoplastic polyolefin (ii) is selected from the group consisting of homopolymers or copolymers of olefinic $C_2$ to $C_{20}$ monomers or copolymers thereof with (meth)acrylates or vinylacetate.

5. The composition of claim 1 wherein the thermoplastic polyolefin (ii) is polypropylene.

6. The composition of claim 1 wherein the chlorinated polyolefin (b) is a chlorination product of polyolefins selected from the group consisting of high density polyethylene (HDPE), low density polyethylene (LDPE), linear low density polyethylene (LLDPE), polypropylene and copolymers of ethylene and propylene.

7. A high-frequency (HF) weldable shaped article comprising
    (A) a thermoplastic elastomer vulcanizate comprising
        (i) a vulcanized rubber; and
        (ii) a thermoplastic polyolefin homopolymer or copolymer; and an effective amount of
    (B) a polar modifier comprising a mixture of at least about 2.5 to about 10 wt.-% of the chlorinated polyolefin resin (b) and at least about 35 about 90 wt.-% of the thermoplastic polyurethane resin (a), based on the total amount on the total amount of (A), (a) and (b).

8. The high-frequency (HF) weldable shaped article of claim 7 wherein the rubber (i) is selected from the group consisting of ethylene/alpha-olefin/non-conjugated diene copolymer rubbers, copolymer rubbers of monomers comprising ethylene and at least one other alpha-olefin of the formula $CH_2=CHR$ wherein R is a straight or branched alkyl residue of 1 to 12 carbon atoms, butyl rubber, halogenated butyl rubber, copolymers of $C_4$ to $C_{12}$ isomonoolefins and para-alkylstyrene or their halogenated derivatives, natural or synthetic rubbers, polyisoprene rubber, polybutadiene rubber, styrene/butadiene copolymer rubbers and blends thereof.

9. The high-frequency (HF) weldable shaped article of claim 7 wherein the thermoplastic rubber (A) comprises about 10 wt.-% to about 95 wt.-% of said rubber (i) and about 90 wt.-% to about 5 wt.-% of the thermoplastic polyolefin homopolymer or copolymer (ii), based on the total amount of (i) and (ii).

10. The high-frequency (HF) weldable shaped article of claim 7 wherein the thermoplastic polyolefin (ii) is selected from the group consisting of homopolymers or copolymers of olefinic $C_2$ to $C_{20}$ monomers or copolymers thereof with (meth)acrylates or vinylacetate.

11. The high-frequency (HF) weldable shaped article of claim 7 wherein the thermoplastic polyolefin (ii) is polypropylene.

12. The high-frequency (HF) weldable shaped article of claim 7 wherein the chlorinated polyolefin (b) is a chlorination product of polyolefins selected from the group consisting of high density polyethylene (HDPE), low density polyethylene (LDPE), linear low density polyethylene (LLDPE), polypropylene and copolymers of ethylene and propylene.

13. The high-frequency (HF) weldable shaped article of claim 7 being selected from films, foils, profiles, textile reinforced sheets and coatings.

\* \* \* \* \*